United States Patent
Kumfer

(10) Patent No.: US 10,513,448 B2
(45) Date of Patent: Dec. 24, 2019

(54) ELECTROOXIDATION AT ELEVATED PRESSURES

(71) Applicant: SIEMENS ENERGY, INC., Orlando, FL (US)

(72) Inventor: Bryan J. Kumfer, Ringle, WI (US)

(73) Assignee: SIEMENS ENERGY, INC., Orlando, FL (US)

(*) Notice: Subject to any disclaimer, the term of this patent is extended or adjusted under 35 U.S.C. 154(b) by 0 days.

(21) Appl. No.: 16/075,189

(22) PCT Filed: Feb. 3, 2017

(86) PCT No.: PCT/US2017/016385
§ 371 (c)(1),
(2) Date: Aug. 3, 2018

(87) PCT Pub. No.: WO2017/136647
PCT Pub. Date: Aug. 10, 2017

(65) Prior Publication Data
US 2019/0047881 A1   Feb. 14, 2019

Related U.S. Application Data

(60) Provisional application No. 62/291,746, filed on Feb. 5, 2016.

(51) Int. Cl.
*C02F 1/467* (2006.01)
*C02F 1/461* (2006.01)
(Continued)

(52) U.S. Cl.
CPC .. *C02F 1/4672* (2013.01); *C02F 2001/46128* (2013.01); *C02F 2001/46147* (2013.01);
(Continued)

(58) Field of Classification Search
CPC .............. C02F 1/4672; C02F 2201/005; C02F 2201/46145; C02F 2201/4614;
(Continued)

(56) References Cited

U.S. PATENT DOCUMENTS 4,085,028 A    4/1978  McCallum
5,439,577 A *  8/1995  Weres ................ C02F 1/46104
                                                          204/268

(Continued)

FOREIGN PATENT DOCUMENTS

CN    104773792 A    7/2015
EP    0659691 A1    6/1995
(Continued)

OTHER PUBLICATIONS

PCT International Search Report and Written Opinion of International Searching Authority dated May 19, 2017 corresponding to PCT International Application No. PCT/US2017/016385 filed Feb. 3, 2017.

*Primary Examiner* — Louis J Rufo

(57) ABSTRACT

There are provided electrooxidation systems and processes which provide an elevated pressure at which components are oxidized in an electrooxidation cell. The elevated pressure reduces power consumption for the cell at least in part by reducing the formation of gas bubbles, which typically leads to increased resistance and an increased power output.

6 Claims, 2 Drawing Sheets

(51) Int. Cl.
*C02F 101/34* (2006.01)
*C02F 103/36* (2006.01)

(52) U.S. Cl.
CPC .... *C02F 2101/34* (2013.01); *C02F 2103/365* (2013.01); *C02F 2201/005* (2013.01); *C02F 2201/4611* (2013.01); *C02F 2201/4614* (2013.01); *C02F 2201/46145* (2013.01); *C02F 2201/46155* (2013.01); *C02F 2209/03* (2013.01)

(58) Field of Classification Search
CPC .... C02F 2201/4611; C02F 2201/46155; C02F 2103/365; C02F 2101/34; C02F 2001/46147; C02F 2001/46128; C02F 2209/03
See application file for complete search history.

(56) References Cited

U.S. PATENT DOCUMENTS

| | | | |
|---|---|---|---|
| 8,273,225 B2* | 9/2012 | Wilman | C02F 1/46109 |
| | | | 204/254 |
| 2001/0004962 A1* | 6/2001 | Hirota | C02F 1/46104 |
| | | | 204/228.1 |
| 2011/0079520 A1* | 4/2011 | Tretheway | A23L 3/325 |
| | | | 205/744 |
| 2018/0009681 A1* | 1/2018 | Cam | B01D 17/0211 |
| 2018/0243693 A1* | 8/2018 | Benton | C02F 1/445 |
| 2018/0371629 A1* | 12/2018 | Ellis | C02F 1/46104 |

FOREIGN PATENT DOCUMENTS

| | | |
|---|---|---|
| EP | 1008557 A1 | 6/2000 |
| WO | 2014085924 A1 | 6/2014 |

\* cited by examiner

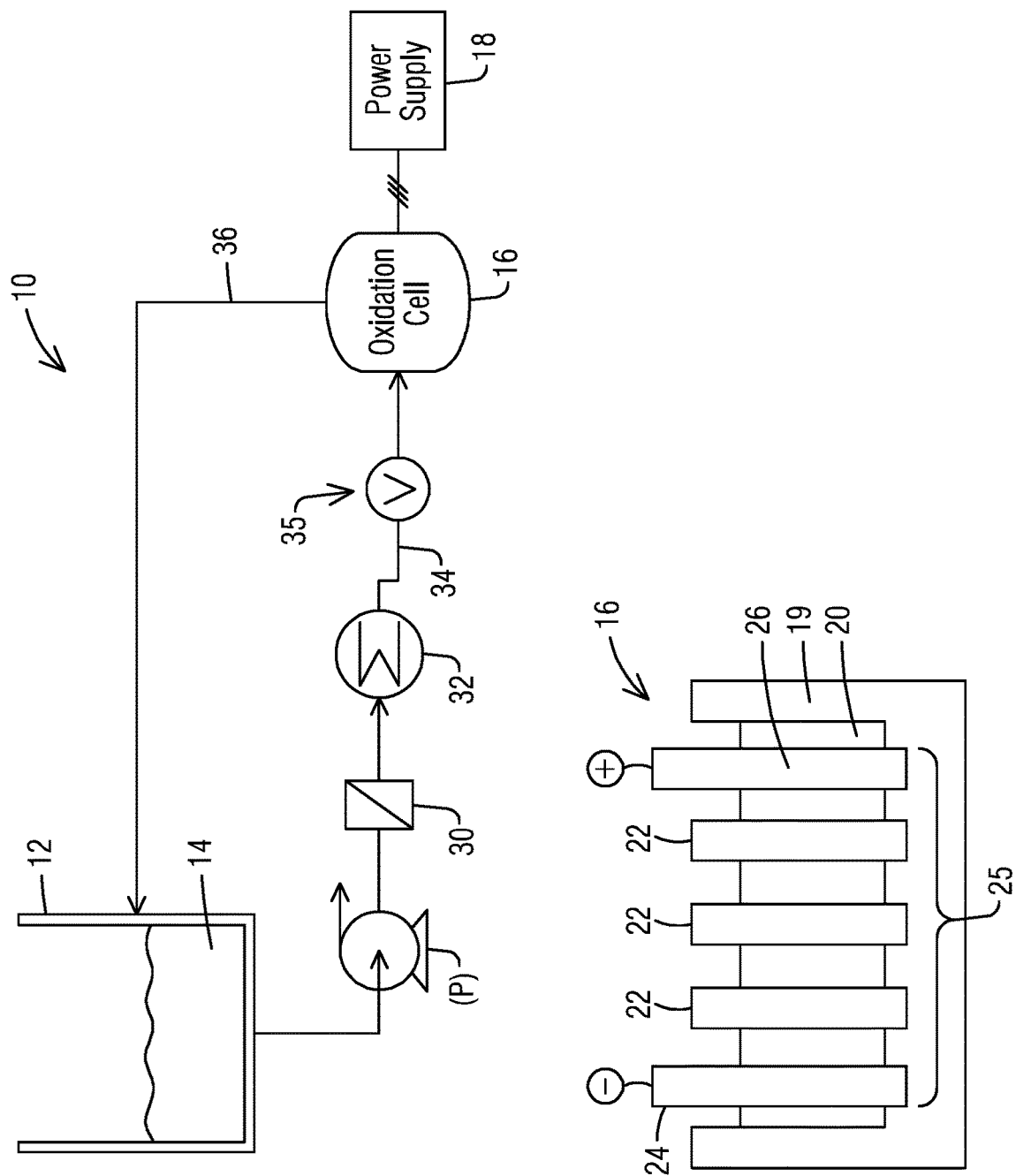

ELECTROOXIDATION AT ELEVATED PRESSURES

CROSS-REFERENCE TO RELATED APPLICATIONS

This application is a National Stage Application of PCT/US2017/016385, filed Feb. 3, 2017, which claimed priority to and the benefit of the filing date of U.S. Provisional Application No. 62/291,746, filed Feb. 5, 2016, the entirety of each of which is hereby incorporated by reference.

FIELD

The present disclosure relates generally to the oxidation processes and systems, and more particularly to systems and methods for treating oxidizable components in a fluid by electrooxidation at elevated pressure.

BACKGROUND

Electrooxidation is an electrochemical process in which oxidation reactions occur by applying an electric field between an anode and a cathode. A number of specially designed electrodes for electrooxidation have been developed in an effort to prolong electrode life and maximize oxidation capacity. One such specially designed electrode has been developed from a boron-doped diamond material. Electrooxidation using such boron-doped diamond materials can be used to treat soluble organics, for example, in wastewater. In the electrooxidation process, high current densities (e.g., $\geq 29,000$ amps/m$^2$) are typically applied to oxidize the target components. In so doing, significant gases may be produced and boiling of the treated fluid may occur due to heat generated in the cell. These gases may cause resistance in the oxidation cell, thereby increasing the voltage needed to pass the current therein, and thereby also increasing the operating costs of the cell.

Current proposed solutions have included operating cells at less than maximum current densities so that gas production has a minimal effect. However, this causes the electrooxidation cell to also operate at less than an optimal oxidation capacity and/or efficiency. In addition, high flow rates have been utilized to sweep generated gases from the cell. High flow rates, however, increase capital and operating costs as a larger pump and piping is required. Accordingly, there is significant room for improvement in the electrooxidation of oxidizable components.

BRIEF DESCRIPTION OF THE DRAWINGS

The invention is explained in the following description in view of the drawings that show:

FIG. 1 is a schematic illustration of a treatment system in accordance with an aspect of the present invention.

FIG. 2 illustrates an embodiment of an electrooxidation cell for use in a treatment system in accordance with an aspect of the present invention.

DETAILED DESCRIPTION

Figure 3:
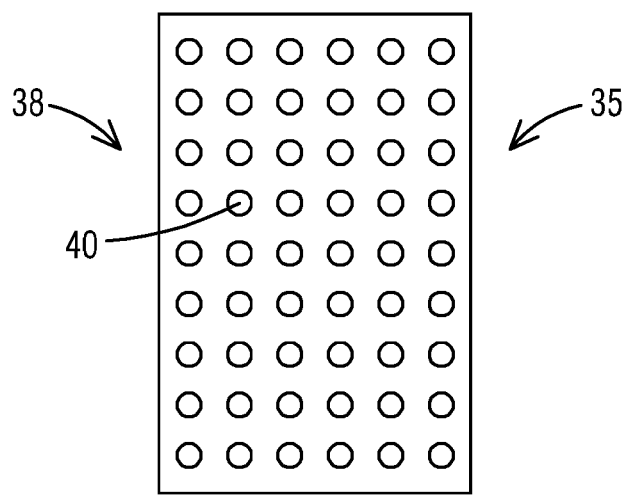
FIG. 3 illustrates an orifice plate for increasing pressure in the electrooxidation cell in accordance with an aspect

In accordance with an aspect of the present invention, there are provided electrooxidation systems and treatment processes which markedly improve the electrooxidation of oxidizable components while reducing costs associated with the operation of an electrooxidation system and cell. In accordance with an aspect, by increasing pressure in the cell during electrooxidation, gas bubbles are reduced and/or eliminated; the size of gas bubbles formed in the cell are decreased and/or eliminated; and/or boiling of the fluid being treated is minimized. In addition, the elevated pressure may reduce resistance within the electrooxidation cell, thereby reducing the voltage needed for oxidation. The lower voltage may, in turn, significantly reduce the power requirements for the cell and extend cell lifetime.

In accordance with an aspect, there is described a process for treating a fluid comprising at least one oxidizable component comprising:

delivering the fluid to an electrooxidation cell for treatment of the at least one oxidizable component;

increasing pressure within an electrooxidation zone of the electrooxidation cell to an elevated pressure of at least about 10 psi; and oxidizing the oxidizable component within the electrooxidation cell at the elevated pressure.

In accordance with another aspect, there is provided a system for treating a fluid comprising at least one oxidizable component comprising:

a source of the fluid comprising at least one oxidizable component;

an electrooxidation cell for treatment of the at least one oxidizable component therein, wherein the electrooxidation cell comprises at least an anode, a cathode, a bipolar electrode between the anode and the cathode, a power source for the cell, and an electrooxidation zone within which electrooxidation takes place;

a pump for delivering the material from the source to the electrooxidation cell; and means for maintaining a pressure within the electrooxidation zone of least about 10 psi.

As used herein, the term "about" refers to a value which may be 5% of the stated value.

Referring to FIG. 1, there is shown an embodiment of a system 10 in accordance with an aspect of the present invention. The system 10 comprises a vessel, e.g. tank 12, which contains an amount of a fluid 14 comprising at least one oxidizable contaminant therein capable of being oxidized by the system 10. The tank 12 may comprise any suitable housing for storing the fluid 14, and may, for example, comprise a closed pressurized or an open air vessel. In addition, the system 10 further includes an electrooxidation cell (hereinafter oxidation cell) 16 as further described below. The oxidation cell 16 may be powered by a local or remote suitable power source 18 which delivers a current between an anode and a cathode of the oxidation cell 16. One or more pumps (P) are typically included for delivering the material 14 from the tank 12 to the cell 16.

The fluid 14 may be any fluid comprising an oxidizable component which is deliverable to the cell 16 for treatment thereof. In an embodiment, the fluid 14 comprises an aqueous fluid. The oxidizable component may comprise any component or compound targeted to be removed from the fluid 14 by the system 10, such as for public health, process design, and/or aesthetic considerations. In some embodiments, the oxidizable component comprises one or more organic materials. Exemplary organic materials to be removed by the system 10 may include pesticides herbicides, phenols, phthalates, and hydrocarbons, e.g., aromatic hydrocarbons, aliphatic hydrocarbons, and the like. In addition, the oxidizable component may instead or further comprise one or more inorganic materials. Exemplary inorganic materials to oxidized by the system 10 may include sulfides, mercaptides, and cyanides.

In one embodiment, the fluid 14 comprises a wastewater from a refinery source comprising an amount of organic compounds therein. As used herein, the term "refinery spent caustic" refers to spent caustic generated in the operation of equipment and processes such as those which may be found at a petroleum refinery. Refinery spent caustic may have high levels of chemical oxygen demand (COD), in some cases between about 400,000 mg/L and 500,000 mg/L or more. Such refinery spent caustic may contain one or more of naphthenic, cresylic, and sulfidic compounds.

In another embodiment, the fluid 14 comprises a waste stream or the like having one or more biologically active oxidizable compounds (oxidizable component) or one stemming from a pharmaceutical-related process. In certain embodiments, these biologically active oxidizable compounds include refractory and recalcitrant organics. In a particular embodiment, the oxidizable component comprises an endocrine disrupting compound. Such compounds represent a class of recalcitrant organics which can affect hormone systems in organisms and are found in the environment. Examples of endocrine disrupting compounds include: alkylphenolics, such as nonylphenol used for removing oil, as well as natural hormones and synthetic steroids found in contraceptives, such as 17-b-estradiol, estrone, testosterone, and ethynyl estradiol.

The electrooxidation (oxidation) cell 16 may comprise any suitable electrooxidation cell known in the art, such as one having at least an anode, a cathode, a bipolar electrode, and suitable structure(s) for applying an electric field between the anode and the cathode. As used herein, the term "bipolar electrode" refers to an electrode which, when placed between an anode and a cathode and a potential is applied thereto, will behave as both an anode and a cathode. Exemplary oxidation cells including at least a cathode, an anode, and a bipolar electrode disposed between the cathode and the anode are set forth U.S. Pat. No. 8,273,225 and in US 2014/0054166, the entirety of each of which is hereby incorporated by reference herein.

Referring to FIG. 2, there is shown, for example, a cross-section of an exemplary oxidation cell 16 for use in the system 10. It is understood, however, that the present invention is not so limited to the configuration shown. As shown, in an embodiment, the oxidation cell 16 comprises a housing 19 formed from an inert material, such as a polymeric material, an electrolyte 20, and a plurality of bipolar electrodes 22 arranged in parallel relationship to one another between an anode 24 and a cathode 26. Via this configuration, an electrooxidation zone 25 is provided between the anode 24 and the cathode 26 within which oxidizable components in the material 14 may be oxidized.

The electrolyte 20, anode 24 and cathode 26 may comprise any material suitable for its intended purpose. In an embodiment, each bipolar electrode 22 may be in the form of a plate or sheet, although the present invention is not so limited. In an aspect, each bipolar electrode 22 comprises a diamond material. The diamond material may comprise a diamond material formed or deposited by a chemical vapor deposition (CVD) process (such as a microwave plasma CVD process), diamond made by a high temperature-high pressure process, and natural type IIb diamond. In other embodiments, the diamond material may comprise a polycrystalline material or a single crystal diamond material. In an embodiment, the diamond material comprises a polycrystalline diamond material, and is formed or deposited by a CVD process.

Further, in certain embodiments, the diamond material may comprise a dopant material to render the diamond material of the bipolar electrode conductive. By way of example, the dopant material may be selected from the group consisting of lithium, beryllium, nitrogen, phosphorous, sulphur, chlorine, arsenic, selenium, and boron. In a particular embodiment, the dopant material comprises boron since boron has a low activation energy, and thus provides for a high conductivity value at room temperature. Doping may be achieved by implantation, but also may be achieved by incorporation of the dopant element during synthesis of the diamond layer, e.g., during synthesis of the diamond by microwave plasma chemical vapor deposition (CVD). An example of a suitable doping procedure where the diamond is polycrystalline diamond is as described in EP 0 822 269, the entirety of which is incorporated by reference herein. An example of a suitable doping procedure where the diamond comprises a single crystal diamond is described in WO 03/052174, the entirety of which is also incorporated by reference herein. In certain embodiments, the bipolar electrode 22 may comprise a boron doped diamond material deposited on a suitable support structure as set forth in US 2014/0054166, also incorporated by reference herein.

In certain embodiments, the system 10 may further include one or more filters 30 as shown in FIG. 1 disposed in a flowpath between the tank 12 and the oxidation cell 16 to remove solids from the material 14 prior to delivery to the oxidation cell 16. In an embodiment, the filter 30 may comprise a screen or membrane-type filter having a desired opening or pore size as needed for the particular application. In accordance with another aspect, the system 10 may employ one or more coolers 32 therein for reducing a temperature of the fluid 14 prior to input to the oxidation cell. In an embodiment, the fluid 14 has a temperature of 60° C. or less upon introduction into the oxidation cell 16. In a particular embodiment, the fluid 14 has a temperature of 40-60° C. upon entry into the oxidation cell 16, and in a particular embodiment, about 50° C. Generally, the higher the temperature, the higher the conductivity for the oxidation cell 16; however, operating temperature limits of the cell 16 must be observed.

In accordance with an aspect, the system 10 may further include any suitable structure or arrangement (hereinafter "pressure maintaining means 35") which provides and maintains an elevated pressure in the oxidation zone 25 of the oxidation cell 16. The oxidation zone 25 may be understood to refer to any portion of the cell 16 wherein the fluid 14 may be treated to oxidize one or more components in the fluid 14. In certain embodiments, the elevated pressure comprises a pressure which is at least greater than atmospheric pressure. In an embodiment, the elevated pressure may be ≥ about 10 psi (0.69 bar), such as from 10 psi (0.69 bar) to 50 psi (3.45 bar), and in particular embodiment about 20 psi (1.38 bar) to about 45 psi (3.10 bar). As set forth in the example below, the present inventor has found that the power consumption of an electrooxidation cell 16 as described herein may be lowered by about 25% by increasing pressure in the cell from ≤10 psi to 20-45 psi. The reduced power consumption has numerous advantages, such as lower operating costs, and reduced footprint requirements.

In addition, the inventor has found that an elevated pressure in the cell 16 (e.g., ≥ about 10 psi) may advantageously:

1) increase the electrooxidation efficiency of oxidizable components while also reducing costs associated with the operation of the system 10 and cell 16.

2) reduce and/or eliminate gas bubble formation in the cell 16 during operation—even at higher current densities (e.g., >10,000 amps/m$^2$);

3) decrease the size of gas bubbles in the cell 16 during operation—even at higher current densities (e.g., >10,000 amps/m$^2$);

4) minimize and/or eliminate boiling of fluid 14 being treated in the cell 16;

5) reduce the resistance of the oxidation cell 16, thereby reducing the voltage needed for oxidation 16; and/or 6) significantly reduce power requirements as noted above, and thus extend cell lifetime.

Due to at least the reduced gas bubble formation and other benefits noted above, the oxidation cell 16 may be operated at greater current densities than known electrooxidation cells and systems, thereby increasing the electrooxidation capacity and/or efficiency of the oxidation cell 16. Thus, in accordance with another aspect, the oxidation cell 16 as described herein may be operated at the elevated pressure and at a current density of at least about 10,000 amps/m$^2$. In an embodiment, the current density may be operated at a current density of from about 10,000 amps/m$^2$ to about 40,000 amps/m$^2$, and in a particular embodiment from about 25,000 to about 35,000 amps/m$^2$. Below 10,000 amps/m$^2$, oxidation efficiency would be increasingly reduced or limited as the current density is lowered.

As mentioned, any suitable structure or method known in the art ("pressure maintaining means 35") may be utilized for providing and/or maintaining the elevated pressure within the oxidation cell 16. In an embodiment, as shown in FIG. 1, the pressure maintaining means 35 may comprise a flow control valve (V) at either an inlet flowpath 34 leading into the oxidation cell 16 as shown and/or an outlet flowpath 36 traveling therefrom. Further, the flow control valve (V) may be effective to regulate a flow of the fluid 14 to the oxidation cell 16 and/or regulate a flow of the fluid 14 exiting the oxidation cell 16 to a degree effective to provide the desired elevated pressure within the oxidation cell 16.

In accordance with another aspect, as shown in FIG. 3, the pressure maintaining means 35 may instead or further comprise an orifice plate 38 which may be disposed within or externally of the oxidation cell 16. In an embodiment, the orifice plate 38 may be disposed at or near an inlet or the outlet flowpath 36 (FIG. 1) to provide the elevated pressure within the oxidation zone 25 of the oxidation cell 16. The orifice plate 38 may be formed from any relatively rigid and inert material such as a stainless steel or a polymeric material. In addition, the orifice plate 38 may include a plurality of openings 40 therein dimensioned so as to increase a pressure within the oxidation zone 25 of the cell 16 to a desired degree.

In accordance with another aspect, the pressure maintaining means 35 may comprise a height difference between the cell 16 and the tank 12, inlet flowpath 34, and/or outlet flowpath 36, which provides some or all of the desired pressure to the cell 16. In an embodiment, for example, an elevated pressure may be provided within the oxidation zone 25 of the cell 16 by adjusting a height of the oxidation cell 16 to a desired degree relative to the tank 12, inlet flowpath 28, and/or outlet flowpath 30. In a particular embodiment, for example, a head pressure of the tank 12 may be utilized to provide the desired pressure in the cell 16. By way of example, in an embodiment, every foot of head of the tank 12 exerts approximately 0.43 psi on the reactor. So, if a liquid level in the tank 12 is a predetermined distance, e.g., 60-90 ft, above the cell 16, then a control valve may not be needed as the head pressure of the tank 12 may be sufficient to provide the desired pressure within the oxidation zone 25 of the cell 12. Tanks that are 20 m high are not uncommon, and thus such tanks may include sufficient head height to run the system 10 without a control valve.

It is appreciated that the flow rates, and the like may be modified such that the fluid 14 is treated to a desired extent within the cell. In an embodiment, the fluid 14 is passed several times through the cell. As such, after any given treatment cycle within the cell 16, the resulting treated fluid may be recycled back to the tank 12 as shown in FIG. 1 for additional treatment thereof by the system 10, or otherwise delivered to another upstream process, and/or may otherwise exit the system for additional treatment, storage, transport, or disposal.

In the systems and processes described herein, it is appreciated that one or more inlets, pathways, outlets, pumps, valves, coolers, energy sources, flow sensors, or controllers (e.g., comprising a microprocessor, an input, an output, and a memory), or the like may be included in any of the embodiments described herein for facilitating the introduction, output, timing, volume, selection, and direction of flows of any of the materials therein. Moreover, it is appreciated the skilled artisan would understand the volumes, flow rates, and other parameters necessary to achieve the desired result(s).

The function and advantages of these and other embodiments of the present invention will be more fully understood from the following examples. These examples are intended to be illustrative in nature and are not considered to be limiting the scope of the invention.

EXAMPLES

Example 1

Figure 4:
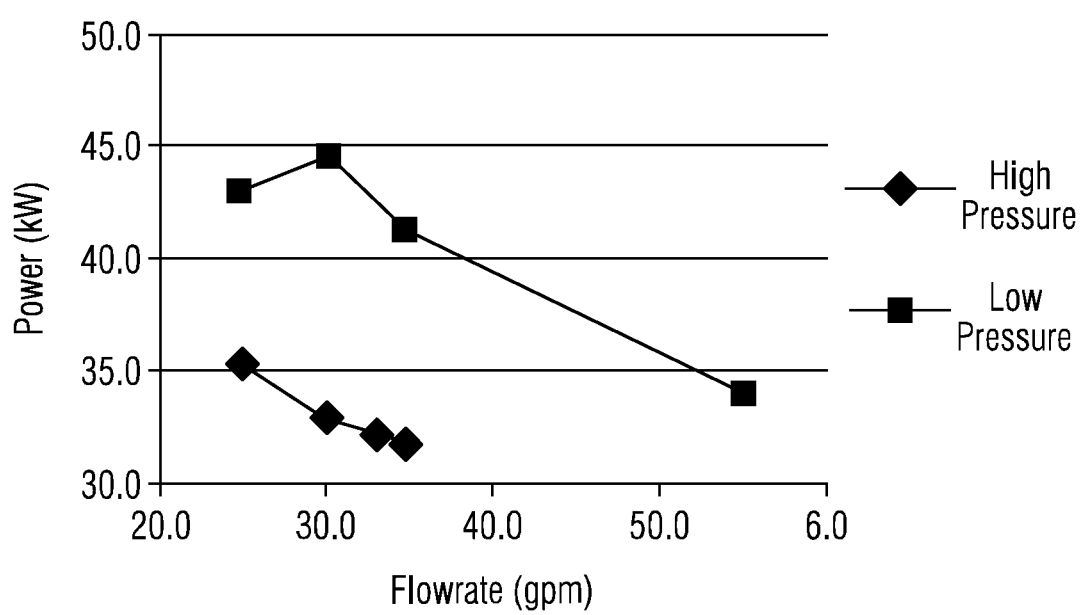
FIG. 4 is a graph illustrating a reduction in power consumption by an electrooxidation cell by increasing pressure in the electrooxidation cell in accordance with an aspect of the present invention.

Referring to FIG. 4 and Table 1 below, the power consumption of an exemplary oxidation cell was shown to be lowered by about 25% by increasing pressure in the cell from ≤10 psi to 20-45 psi. To demonstrate this, a series of tests were performed using a sodium citrate/sodium bicarbonate solution. The power consumption of the electrooxidation cell was evaluated at high and low pressure conditions at various flow rates. The temperature of the solution was maintained at 45° C. For the low pressure conditions, the pressure was maintained at pressures below 10 psi at the inlet of the reactor, and there was no backpressure at the outlet of the reactor. The only exception was for the flow rate of 55 gpm which had an inlet pressure of 20 psi due to pressure created by the cell. For the high pressure conditions, the pressure was maintained between 20-45 psi at the inlet of the reactor. This pressure was maintained by controlling the pressure at the outlet of the reactor using a manual control valve. The outlet pressure varied by flow rate, but generally the pressure drop across the reactor was 5-10 psi for the flows tested. The results were as follows:

TABLE 1

| Flow Rate (gpm) | Pressure (psi) | Amps | Volts | Kw |
| --- | --- | --- | --- | --- |
| 34.7 | 42.1 | 375 | 85 | 31.9 |
| 33.1 | 38.2 | 375 | 86 | 32.3 |
| 30.0 | 30.7 | 375 | 88 | 33.0 |
| 25.0 | 20.9 | 375 | 94 | 35.3 |

TABLE 1-continued

| Flow Rate (gpm) | Pressure (psi) | Amps | Volts | Kw |
|---|---|---|---|---|
| 24.7 | 4.6 | 358 | 120 | 43.0 |
| 30.0 | 6.5 | 370 | 120 | 44.4 |
| 34.5 | 8.7 | 375 | 110 | 41.3 |
| 55.0 | 20.2 | 375 | 91 | 34.1 |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What we claimed is:

1. A process for treating a fluid comprising at least one oxidizable component comprising:
    delivering the fluid to an electrooxidation cell for treatment of the at least one oxidizable organic component;
    increasing and maintaining pressure within an electrooxidation zone of the electrooxidation cell to provide an elevated pressure of from 10 psi to 50 psi and a pressure drop across the electrooxidation cell of between 5 psi and 10 psi; and
    oxidizing the oxidizable component within the electrooxidation cell at the elevated pressure at a current density of from 10,000 amps/m$^2$ to 40,000 amps/m$^2$; and
    wherein the electrooxidation cell comprises at least an anode, a cathode, a bipolar electrode between the anode and the cathode, and a power source for the cell, the bipolar electrode further comprising a diamond material doped with a conductive dopant material.

2. The process of claim 1, wherein the elevated pressure is from 20 psi to 45 psi.

3. The process of claim 1, wherein the oxidizing is done at a current density of from 25,000 amps/m$^2$ to 35,000 amps/m$^2$.

4. The process of claim 1, wherein the dopant material is selected from the group consisting of lithium, beryllium, nitrogen, phosphorous, sulfur, chlorine, arsenic, selenium, and boron.

5. The process of claim 4, wherein the dopant material comprises boron.

6. The process of claim 1, wherein the increasing pressure within the electrooxidation cell is done by at least one of:
    providing an orifice plate having a plurality of openings within a flowpath of the fluid dimensioned to increase pressure to a desired degree;
    regulating a flow of the fluid with a flow control valve at an inlet and an outlet to the electrooxidation cell; or
    increasing a height of a source of the fluid relative to a flowpath leading to and from the electrooxidation cell or to the electrooxidation cell.

* * * * *